United States Patent
Huang et al.

(10) Patent No.: US 8,281,161 B2
(45) Date of Patent: Oct. 2, 2012

(54) DATA ACCESSING APPARATUS AND PROCESSING SYSTEM USING THE SAME

(75) Inventors: Yu-chung Huang, Taipei (TW); Meng-fen Wu, Yonghe (TW); Chun-hsiung Wei, Xindian (TW)

(73) Assignee: Genesys Logic, Inc., Shindian, Taipei (TW)

( * ) Notice: Subject to any disclaimer, the term of this patent is extended or adjusted under 35 U.S.C. 154(b) by 495 days.

(21) Appl. No.: 12/551,307

(22) Filed: Aug. 31, 2009

(65) Prior Publication Data

US 2010/0257380 A1    Oct. 7, 2010

(30) Foreign Application Priority Data

Apr. 3, 2009    (TW) ................................ 98205450 U

(51) Int. Cl.
     *G06F 1/00*          (2006.01)
(52) U.S. Cl. ....................................................... 713/300
(58) Field of Classification Search .................... 713/300
See application file for complete search history.

(56) References Cited

U.S. PATENT DOCUMENTS

| 7,406,614 | B2 * | 7/2008 | Peleg et al. | .................. | 713/320 |
| 7,454,643 | B2 * | 11/2008 | He et al. | ........................ | 713/340 |
| 7,490,251 | B2 * | 2/2009 | Lum et al. | ..................... | 713/300 |

\* cited by examiner

*Primary Examiner* — Paul R Myers
*Assistant Examiner* — Jeremy S Cerullo

(57) ABSTRACT

A data access apparatus and a processing system using the same are disclosed herein, which can be a power-off status to permit its storage media being accessible by another processing system. When a bus signal switching and conversion unit receives a first-level control signal, the storage media is permitted to electrically connect only with a first bus channel and to perform a conversion between a first and second bus interface formats to the accessed data and to supply a system power based on a first power signal from the processing system to the storage media. When the bus signal switching and conversion unit receives the second-level control signal, the storage media is permitted to electrically connect only with a second bus channel and to perform a conversion between a second and third bus interface formats to the accessed data, and to supply a system power based on a second power signal from the another processing system to the storage media.

31 Claims, 8 Drawing Sheets

DATA ACCESSING APPARATUS AND PROCESSING SYSTEM USING THE SAME

CLAIM OF PRIORITY

This application claims priority to Taiwanese Patent Application No. 098205450 filed on Apr. 3, 2009.

BACKGROUND OF THE INVENTION

1. Field of the Invention

The present invention relates to a data accessing apparatus and a processing system using the same, and more particularly, to a data accessing apparatus for providing the processing system with a capability of being a power-off status to permit data access from/to its storage media by the other processing system.

2. Description of the Prior Art

Common host system, such as a desktop or laptop type computer, a server, a personal digital assistant (PDA), a portable phone, a digital camera and so on, most of which enable performances of their electronic components, e.g. accessing data from/to a specific built-in or additional-attached storage media, in need of a power-on state when a dedicated power supplier or a battery supplies a system power to the host system. In the other word, the respective electronic components of the host system would be unworkable if the host system is on a power-off state. At this moment, if there is a demand to access data from/to the storage media of the powered-off host system, it is necessary to firstly reboot the host system and then await the initialization and inspection on the host system for an interval time. This invokes very inconvenient for the user who operates to consume the data, hastily.

Presently, a prior data accessing apparatus installed within a host system utilizes an additional system controller to detect whether the host system receives an external serial signal input generated from an external device (e.g. a computer) or not, i.e. whether the host system is electrically connected to the external device or not. As long as the host system is powered off and the system controller detects occurrence of the external serial signal input, the system controller controls a power channel switch of a multiplexer (MUX) to draw a standby power from a power supplier of the powered-off host system and performs a voltage conversion, and thereby supplies the power required for operations of various electronic components of the powered-off host system including, for example, a data storage unit (e.g. a hard disk). Under this manner, the external device could be permitted to access the data from/to the data storage unit of the powered-off host system. Note that even when the host system is on the power-off state, the data storage unit, the prior data accessing apparatus and the related components including the system controller still need to consume the standby power from the power supplier. Such a state where the host system is being conditioned should not be a complete power-off state. Briefly, the prior data accessing apparatus is not capable of satisfying the completely powering-off requirements for some host systems. To implement switches of different power channels and data channels, the prior data accessing apparatus needs to be laid out with more additional elements thereon, e.g. several standby power channels are established to electrically connect all of the elements of the prior data accessing apparatus to the standby power, which can not utilizes most of existent components of the host system.

BRIEF SUMMARY OF THE INVENTION

To improve the abovementioned drawbacks, a primary object of the present invention is to provide a data accessing apparatus and a processing system using the same, which can permit a storage media of the completely powered-off processing system (i.e. a host system) being accessed by another processing system, without a need of consuming a standby power of the processing system.

Besides, an another object of the present invention is to provide a data accessing apparatus and a processing system using the same, which merely employs less elements because of using a part of existent components in the processing system, so as to share a storage media with another processing system, without the needs of laying out larger components and connecting various components of the data accessing apparatus with a standby power via its related power channels, in comparison with the prior art. Thus, the present invention can make simplicity and cost savings of the whole apparatus in structure.

To accomplish the above invention object, the present invention discloses a data accessing apparatus and a processing system using the same, which can be separately used for different processing systems including at least one first and second processing systems. The first processing system has a bus control unit for transacting a first bus data having a first bus interface format, a first power supplying unit for supplying a first power signal to the bus control unit, and at least one storage media for storing a second bus data having a second bus interface format therein. The data accessing apparatus includes a first bus channel, a second bus channel and a bus signal switching and conversion unit. Meanwhile, the first bus channel is electrically connected with the bus control unit to transmit the first bus data and the first power signal. The second bus channel is used to transmit a third bus data having a third bus interface format from/to the second processing system independently of the first processing system and supply a second power signal generated from a second power supplying unit of the second processing system, which is independently of the first power supplying unit. Upon receiving a control signal at a first level, the bus signal switching and conversion unit permits electrical connection only between the first bus channel and the storage media, and performs a format conversion between the first and second bus interface formats for the data transmitted between the first bus channel and the storage media, and supplies a system power based on the first power signal to the storage media. On the contrary, as soon as receiving the control signal at a second level, the bus signal switching and conversion unit permits electrical connection only between the second bus channel and the storage media, and performs a format conversion between the second and third bus interface formats for the data transmitted between the second bus channel and the storage media, and supplies a system power based on the second power signal to the storage media.

In a first and second preferred embodiments of the present invention, the first bus interface format is designed to be the same as the third bus interface format but different from the second bus interface format, all of which can support a hot-plug function.

In the first preferred embodiment of the present invention, the first and third bus interface formats are implemented in an Universal Serial Bus (USB) interface format, and the second bus interface format is implemented in either a Serial Advanced Technology Attachment (SATA) bus interface format or a Parallel Advanced Technology Attachment (PATA) bus interface format. In the first embodiment, the bus signal switching and conversion unit further includes a bus switch and a bus signal conversion unit, wherein as soon as receiving the control signal at the first level, the bus switch is switched to electrically conduct with the first bus channel, and thereby transmits the first bus data having the first bus interface format from the first bus channel and transmits the first power signal. On the contrary, as soon as receiving the control signal at the second level, the bus switch is switched to electrically conduct with the second bus channel, and thereby transmits the third bus data having the third bus interface format from the second bus channel and transmits the second power signal. The bus signal conversion unit is electrically connected the bus switch and the storage media, respectively and performs a format conversion between either the first and second bus interface formats or the second and third bus interface formats for the accessed data transmitted between the bus switch and the storage media, and supplies the system power based on one of the first and second power signals to the storage media. For other application, said control signal is implemented in the second power signal transmitted from the second bus channel, wherein the first level of the control signal is set to zero when the bus switch does not receive the second power signal yet, and the second level of the control signal is set to a specific high level when the bus switch receives the second power signal.

In the second preferred embodiment of the present invention, the first and third bus interface formats are implemented in either an External Serial Advanced Technology Attachment (eSATA) bus interface format or an Universal Serial Bus (USB) interface format, and the second bus interface format is implemented in either a Serial Advanced Technology Attachment (SATA) bus interface format or a Parallel Advanced Technology Attachment (PATA) bus interface format. In the second embodiment, except that the bus switch and the bus signal conversion unit are the same as used in said first embodiment, a protection mechanism is differently introduced which is used to generate the first-level control signal to control electrical connection only between the bus switch and the first bus channel upon detecting occurrence of the first power signal, and generate the second-level control signal to control electrical connection only between the bus switch and the second bus channel upon detecting nonoccurrence of the first power signal.

In the third preferred embodiment of the present invention, the first bus interface format is designed different from or identical with the second bus interface format but different from the third bus interface format, all of which support the hot-plug function. For example, in the third embodiment, the first bus interface format is implemented in either an External Serial Advanced Technology Attachment (eSATA) bus interface format, a Serial Advanced Technology Attachment (SATA) bus interface format or a Parallel Advanced Technology Attachment (PATA) bus interface format, and the second bus interface format is implemented in either a Serial Advanced Technology Attachment (SATA) bus interface format or a Parallel Advanced Technology Attachment (PATA) bus interface format, and the third bus interface format is implemented in an Universal Serial Bus (USB) interface format. In the third embodiment, the protection mechanism of the data accessing apparatus is used to generate the first-level control signal so as to control electrical connection only between the bus switch and the first bus channel upon detecting occurrence of the first power signal, and generate the second-level control signal to control electrical connection only between the bus switch and the second bus channel upon detecting nonoccurrence of the first power signal.

Besides the present invention discloses a processing system capable of electrically connecting to another processing system, which includes a first power supplying unit, a bus control unit, a storage media and the aforementioned data accessing apparatus.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE INVENTION

Figure 1A:
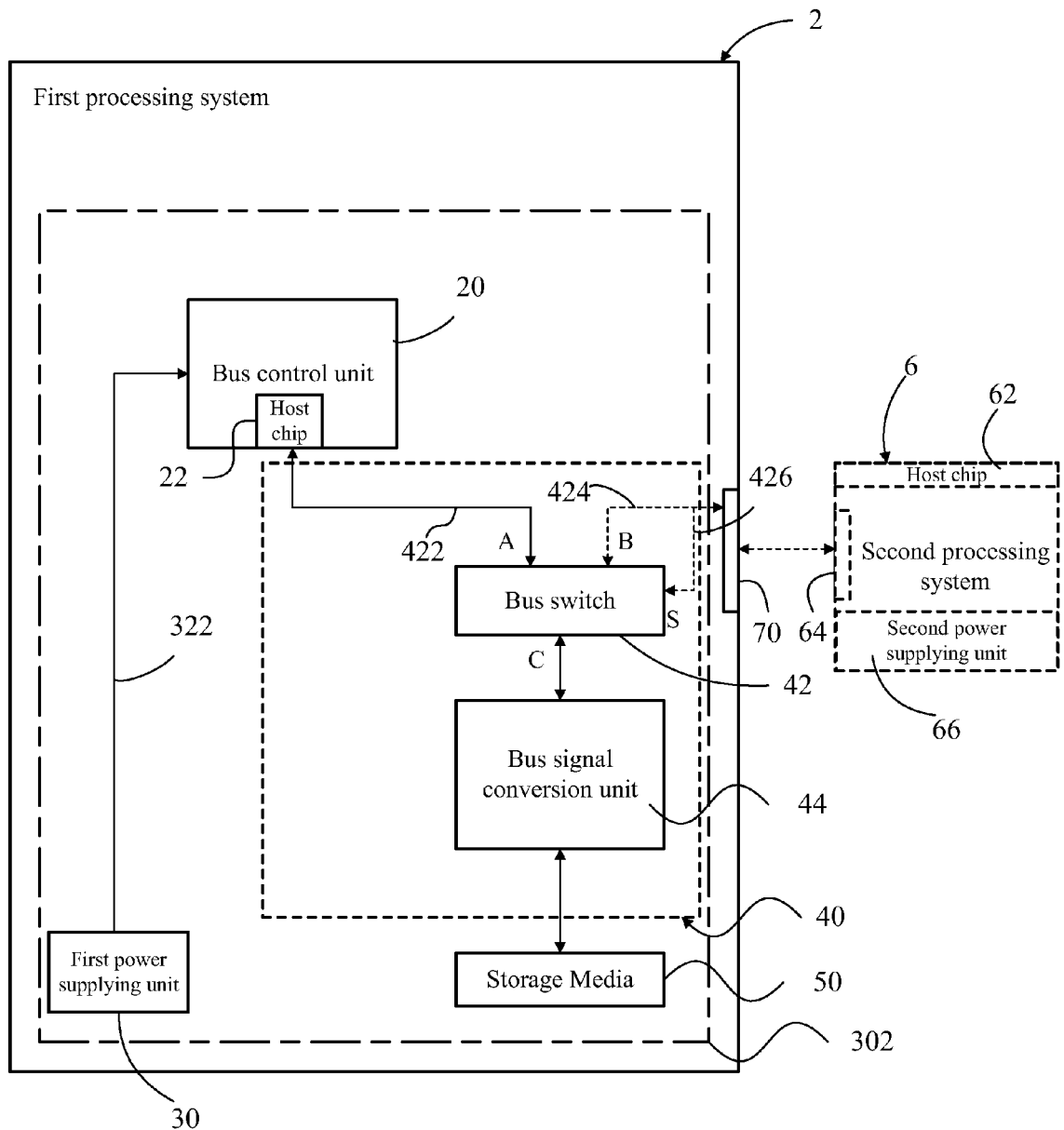
FIG. 1A illustrates an architectural block diagram of a first processing system according to a first preferred embodiment of the present invention, which expresses a status when the powered-on first processing system operates, normally and is electrically disconnected with a second processing system.

Firstly referring to illustration of FIG. 1A, a first processing system 2 according to a first preferred embodiment of the present invention is introduced herein, which principally includes a bus control unit 20 for transacting a first bus data which is formalized in a first bus interface format, a first power supplying unit 30 for supplying a first power signal 322 to the bus control unit 20, a data accessing apparatus 40 and at least one storage media 50 for storing a second bus data therein, which is formalized in a second bus interface format. While the first processing system 2 is in a powered-off status when the first power supplying unit 30 stops supplying the first power signal 322 to various specific elements disposed within the first processing system 2, including, for example, the bus control unit 20, the data accessing apparatus 40, the storage media 50 and so on, it is permitted that the storage media 50 of the first processing system 2 is data accessed by a host chip disposed within a second processing system 6 and is supplied with a system power by a second power supplying unit 66 disposed within the second processing system 6. In this first embodiment, the first processing system 2 has a peripheral bus interface 70, such as an universal serial bus (USB) connector whose the type includes but is not limited to any one of a standard 'A' type, a standard 'B' type, a 'mini-A' type and a 'mini-B' type, connecting to the other corresponding peripheral bus interface 64 (i.e. a USB port via a USB cable) disposed within the second processing system 6 outside of/separated from the first processing system 2. In the other cases, the first and second processing systems 2, 6 can be developed respectively to any one of a host system, a subsystem, an embedded system, a personal-consuming or an industrial computerized device, a server, a digital camera or photo frame, a netbook, a Mobile Internet Device (MID), a cellular phone, a flash disk, MP3 or MP4, a personal digital assistant (PDA), a playing-game device, a set top box (STB), a digital TV (DTV), a personal video recorder (PVR), a digital video recorder (DVR) or a multi-media player (MMP) and the other likes because the first and second processing systems 2, 6 individually own a host chip 22, 62 capably of controlling the bus transactions.

In this first embodiment, the host chip 22 of the bus control unit 20 of the first processing system 2 is designed as a USB host chip for supporting the first bus interface such as a USB interface and transacting the first bus data having the first bus interface format. While the first processing system 2 operates under a powered-on status, not only most of elements disposed within the first processing system 2, including the bus control unit 20, but also the other controlled elements the first processing system 2, including the data accessing apparatus 40 and the storage media 50, are supplied with the system power based on the first power signal 322 generated from the first power supplying unit 30 since the host chip 22 of the bus control unit 20 supports the USB interface.

The at least one storage media 50 can be implemented in a hard disk driver (HDD), a disk array or an optical disk driver (ODD), and is used to store the second bus data therein, whose the second bus interface format is implemented in a Serial Advanced Technology Attachment (SATA) bus interface format or a Parallel Advanced Technology Attachment (PATA) bus interface format, i.e. an IDE interface format.

The data accessing apparatus 40 according to the first preferred embodiment of the present invention includes a first bus channel 422, a second bus channel 424 and a bus signal switching and conversion unit (not labeled), wherein the first bus channel 422 is electrically connected with the bus control unit 20, and transmits the first bus data having the first bus interface format (e.g. an USB-formatted data) from/to the bus control unit 20 and a system power based on the first power signal 322 to the bus signal switching and conversion unit when the first processing system 2 operates under a power-on status. When the first processing system 2 is in a power-off status, the second bus channel 424 is capable of transmitting a third bus data having a third bus interface format (e.g. an USB-formatted data), via the peripheral bus interfaces 64, 70, from/to the host chip 62 (e.g. a USB host chip) of the second processing system 6, and supplying a second power signal generated from a second power supplying unit 66 disposed within the second processing system 6 to the bus signal switching and conversion unit since the second bus channel 424 supports the USB interface format. The second power supplying unit 66 of the second processing system 6 can be implemented in a power supplier or a battery, which is independently of the first power supplying unit 30 of the first processing system 2, namely without a need of usage of a standby power or any other power provided from the first power supplying unit 30. Thus, the second processing system 6 can be permitted to access the data from the storage media 50 upon the first processing system 2 is completely powered off.

In the first embodiment, the bus signal switching and conversion unit further includes a bus switch 42 and a bus signal conversion unit 44, and the first and third bus interface formats are implemented in an Universal Serial Bus (USB) interface format. Therefore, the bus switch 42 also supports the first bus interface format as USB interface format and has three receiving terminals 'A', 'B', 'S' and an outputting terminal 'C', wherein the receiving terminal 'A' is used to be electrically connected with the first bus channel 422, the receiving terminal 'B' is used to be connected with the second bus channel 424, and the receiving terminal 'S' is used to receive an external control signal 426. The bus switch 42 switches one of the receiving terminals 'A' and 'B' to be electrically connected and conducted with the outputting terminal 'C' but the other receiving terminal 'A' or 'B' not to be electrically conducted with the outputting terminal 'C', based on a specific level of the external control signal 426. In the first embodiment, the receiving terminal 'S' is implemented in a com.-port selecting pin, and the control signal 426 is designed as using the second power signal transmitted via the second bus channel 424, such as a power voltage (i.e. V bus) transmitted in the USB bus.

The bus signal conversion unit 44 has at least one terminal electrically connected with the outputting terminal 'C' via a bus channel supporting the first or third bus interface format (e.g. USB), and another terminal electrically connected with the storage media 50 via another bus channel supporting the second bus interface format (e.g. SATA or PATA), and thereby performs a format conversion between the first or third bus interface format and the second interface format (e.g. an USB-to-SATA data format conversion) for the access data transmitted between the bus switch 42 and the storage media 50, and/or a power voltage conversion for generating the system power, and supplies the system power based on one of the first and second power signals to the storage media 50 for power consumption. In the first embodiment, the bus signal conversion unit 44 is treated as an USB-to-SATA bridge controller.

In operation according to the first embodiment, the first and third bus interface formats are implemented in an USB interface format, and the second bus interface format is implemented in either a Serial Advanced Technology Attachment (SATA) bus interface format or a Parallel Advanced Technology Attachment (PATA) bus interface format, all of which can support a hot-plug function so as to switch different power supplying sources and different data buses to the storage media 50 in time. As shown in FIG. 1A, when the first processing system 2 operates under the power-on status (i.e. when the first power supplying unit 30 supplies the first power signal 322) and the peripheral bus interface 70 is being electrically disconnected with the second processing system 6, if the receiving terminal 'S' of the bus switch 42 does not receive the control signal 426 having a specific level or a first level to zero, the bus switch 42 is switched to permit an electrical connection only between the first bus channel 422 and the bus switch 42 (i.e. both of the terminals 'A' and 'C' are connected only with each other) to transmit the first bus data having the first bus interface format as an USB-formatted data from/to the bus control unit 20 via the first bus channel 422 and supply a system power based on the first power signal 322 from the bus control unit 20 via the first bus channel 422 to the bus signal conversion unit 44 and the storage media 50, as constituting a first power domain 302 which regards the first power supplying unit 30 as its main power source.

Figure 1B:
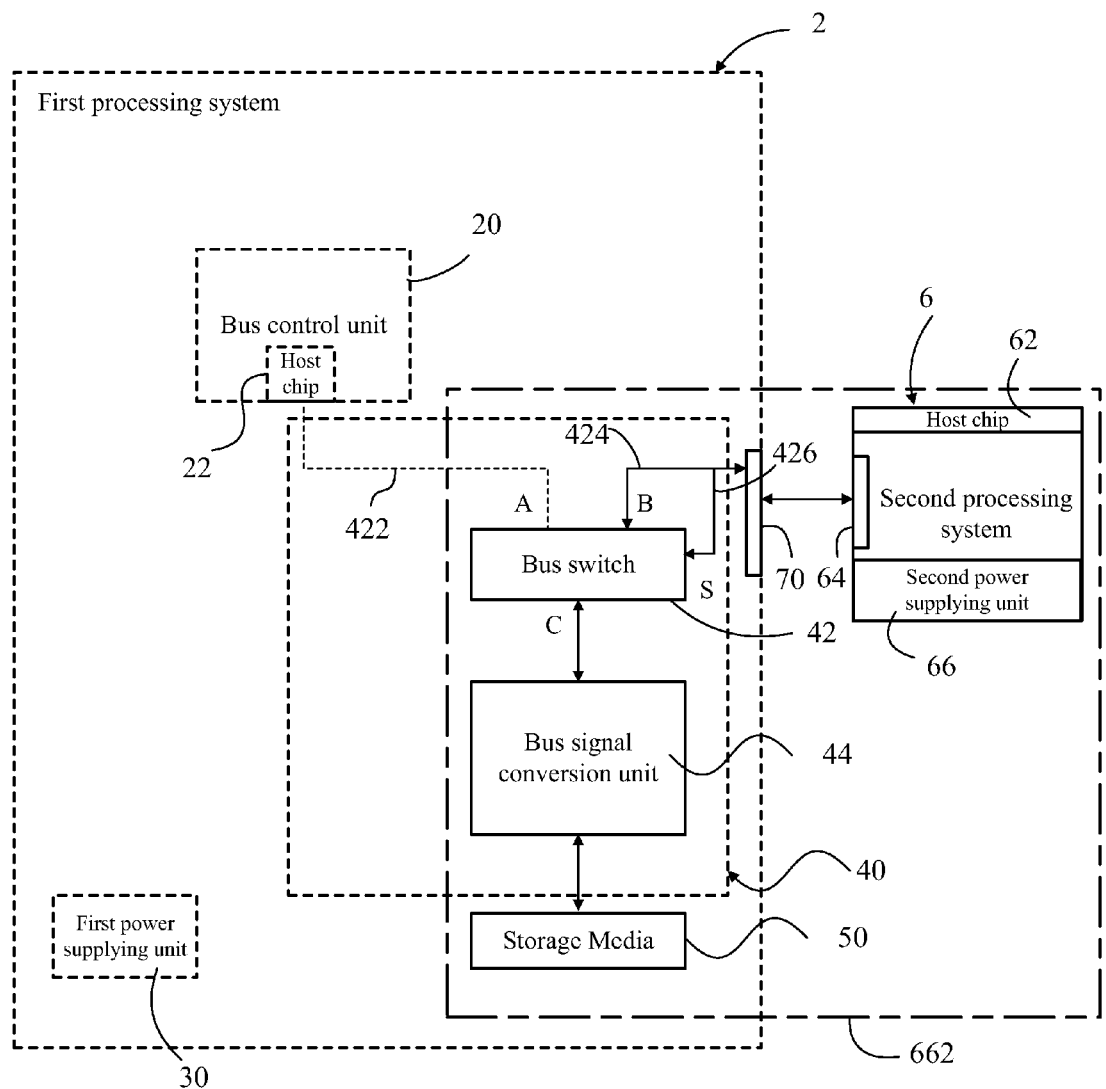
FIG. 1B illustrates the architectural block diagram of the first processing system according to the first preferred embodiment of the present invention, which expresses another status when the powered-off first processing system provides a storage media for direct data access of the second processing system.

Contrarily, as shown in FIG. 1B, when the first processing system 2 is in a power-off status, i.e. the first power supplying unit 30 stop supplying any power signal 322 to the bus switch 42, the bus signal conversion unit 44 and the storage media 50, the second processing system 6 can access data from/to the storage media 50 and transmits the second power signal (as an USB power voltage 'V bus') generated from the second power supplying unit 66 to the receiving terminals 'B', 'S' of the bus switch 42 via the peripheral bus interfaces 64, 70 and the second bus channel 424, by electrically connecting to the first processing system 2, wherein the second power signal transmitted to the receiving terminal 'S' of the bus switch 42 is treated as the control signal 426 for switching the bus switch 42. If the receiving terminal 'S' of the bus switch 42 receives the control signal 426 having said specific level or a second first level at logic high, the bus switch 42 is switched to permit an electrical connection only between the second bus channel 424 and the bus switch 42 (i.e. both of the terminals 'B' and 'C' are connected only with each other) to transmit the third bus data having the third bus interface format as an USB-formatted data from/to the second bus channel 424 and supply a system power based on the second power signal generated from the second power supplying unit 66 via the second bus channel 424 to the bus signal conversion unit 44 and the storage media 50, as constituting a second power domain 662 which regards the second power supplying unit 66 as its main power source, without a need of usage of the first power supplying unit 30. However, in the other appliances, the first processing system 2 is not only applied in a power-off mode but also applied in a power-saving mode or an idle mode.

Figure 2A:
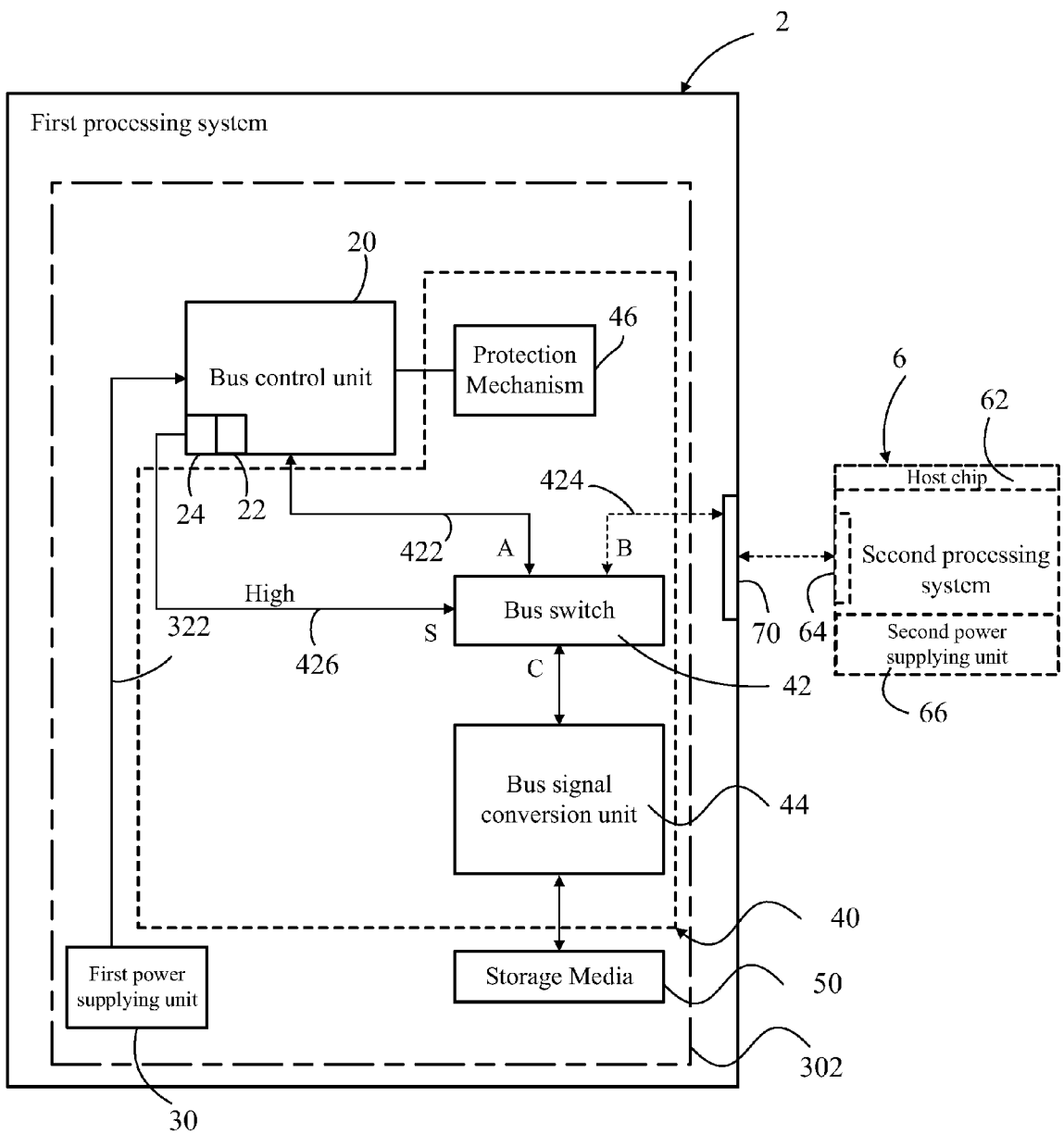
FIG. 2A illustrates an architectural block diagram of a first processing system according to a second preferred embodiment of the present invention, which expresses a status when the powered-on first processing system operates, normally and is electrically disconnected with a second processing system.

Further referring to illustration of FIG. 2A, which depicts an architectural block diagram of a first processing system 2 according to a second preferred embodiment of the present invention. Differently from the first embodiment, this second embodiment introduces that the host chip 22 of the bus control unit 20 is implemented in a SATA bus host chip or a USB host chip, and the bus control unit 20 is disposed with a pin 24 having a General Purpose I/O (GPIO) architecture, and the second processing system 6 also is implemented in a SATA host chip or a USB host chip. Therefore, the first and third bus interface formats used in the second embodiments can be implemented in an External Serial Advanced Technology Attachment (eSATA) bus interface format or an USB interface format, and the second bus interface formats used in the second embodiments can be implemented in Serial Advanced Technology Attachment (SATA) bus interface format or a Parallel Advanced Technology Attachment (PATA) bus interface format, all of which can support the hot-plug function. Except for the bus switch 42 and the bus signal conversion unit 44 which are the same as used in the first embodiment, the second embodiments adds a protection mechanism 46 which is implemented in a hardware or software to detect whether the first power signal 322 occurs or not for an initialization process of the first processing system 2, a specific time or any time.

As shown in FIG. 2A, when detecting occurrence of the first power signal 322 (as when the first processing system 2 operates in the power-on status), the protection mechanism 46 generates the control signal 426 having a first level (e.g. a specific high level) via the GPIO pin 24 of the bus control unit 20 to the receiving terminal 'S' of the bus switch 42 and thereby control or switch the bus switch 42 to be electrically connected only with the first bus channel 422 (i.e. both of the terminals 'A' and 'C' are connected only with each other). By the electrical connection with the bus switch 42, this first bus channel 422 will be capable of transmitting the first bus data having the first bus interface format (as an USB-formatted or an eSATA-formatted data) from/to the bus control unit 20 and supplying a system power based on the first power signal 322 from the bus control unit 20 to the bus signal conversion unit 44 and the storage media 50, as constituting a first power domain 302 which regards the first power supplying unit 30 as its main power source, wherein the bus signal conversion unit 44 performs a format conversion between the first and second bus interface formats (like an eSATA-to-SATA or USB-to-SATA data format conversion) for the data transmitted between the first bus channel 422 and the storage media 50, and/or a power voltage conversion so as to supply the proper system power based on the first power signal 322 to the storage media 50.

Figure 2B:
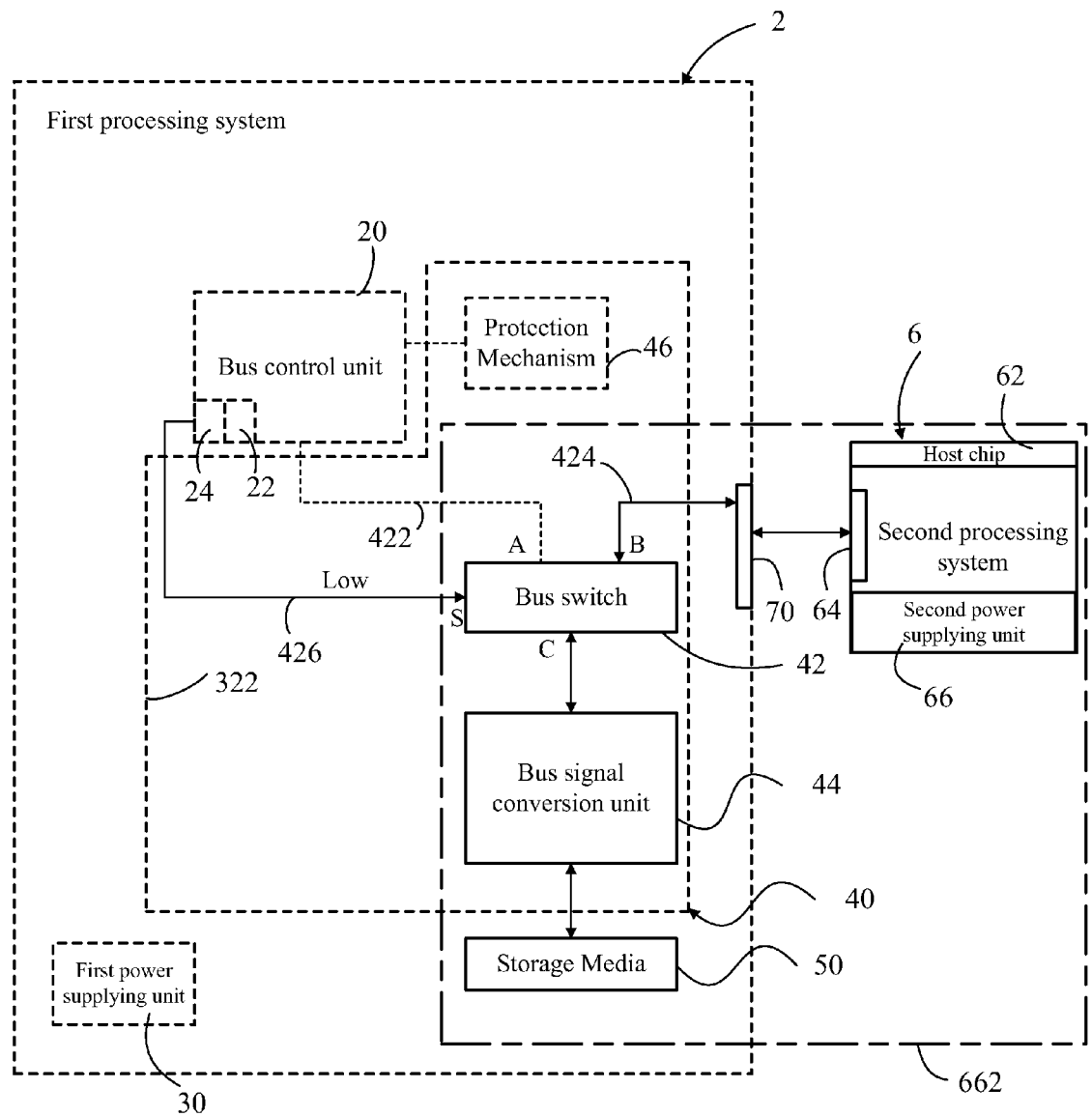
FIG. 2B illustrates the architectural block diagram of the first processing system according to the second preferred embodiment of the present invention, which expresses another status when the powered-off first processing system provides a storage media for direct data access of the second processing system.

As shown in FIG. 2B, when detecting nonoccurrence of the first power signal 322 (as when the first processing system 2 is in the power-off status), the protection mechanism 46 generates the control signal 426 having a second level (e.g. a specific low level) via the GPIO pin 24 of the bus control unit 20 to the receiving terminal 'S' of the bus switch 42 and thereby control or switch the bus switch 42 to be electrically connected only with the second bus channel 424 (i.e. both of the terminals 'B' and 'C' are connected only with each other). By the electrical connection with the bus switch 42, if the second bus channel 424 is electrically connected with the second processing system 6, the second processing system 6 will be capable of transmitting/receiving the third bus data having the third bus interface format (as an USB-formatted or an eSATA-formatted data) from/to the bus control unit 20 via the second bus channel 424 and supplying a system power based on the second power signal from the second power supplying unit 66 via the second bus channel 424 to the bus signal conversion unit 44 and the storage media 50, as constituting a second power domain 662 which regards the second power supplying unit 66 as its main power source, without a need of usage of the first power supplying unit 30, wherein the bus signal conversion unit 44 performs a format conversion between the second and third bus interface formats (like an eSATA-to-SATA or USB-to-SATA data format conversion) for the data transmitted between the second bus channel 424 and the storage media 50, and/or a power voltage conversion so as to supply the proper system power based on the second power signal to the storage media 50.

Figure 2C:
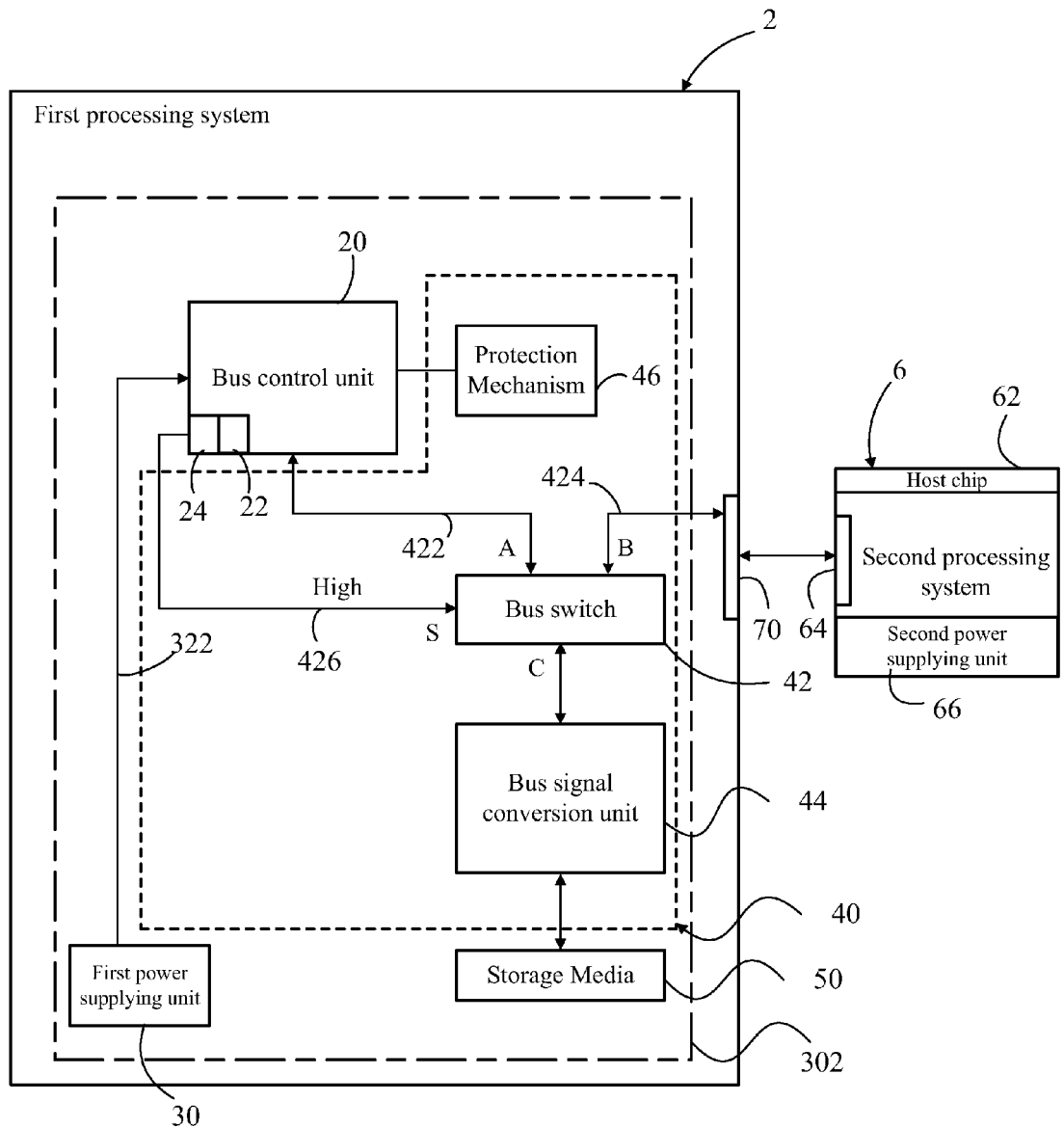
FIG. 2C illustrates the architectural block diagram of the first processing system according to the second preferred embodiment of the present invention, which expresses another status when the powered-on first processing system operates, normally and simultaneously is electrically connected with the second processing system.

Further referring to FIG. 2C, if the first processing system 2 is rebooted to be reconnected with the first power signal 322 after powered off and electrically connected the second processing system 6, the protection mechanism 46 will detect occurrence of the first power signal 322 (i.e. the first processing system 2 returns to the normal operation mode), regardless of electrical connection with the second processing system 6, and generates the control signal 426 having a first level (e.g. a specific high level) via the GPIO pin 24 of the bus control unit 20 to the receiving terminal 'S' of the bus switch 42 and thereby control or switch the bus switch 42 to be electrically connected only with the first bus channel 422 (i.e. both of the terminals 'A' and 'C' are connected only with each other). By the electrical connection with the bus switch 42, this first bus channel 422 will be capable of transmitting the first bus data having the first bus interface format (as an USB-formatted or an eSATA-formatted data) from/to the bus control unit 20 and supplying a system power based on the first power signal 322 from the bus control unit 20 to the bus signal conversion unit 44 and the storage media 50, as constituting a first power domain 302 which regards the first power supplying unit 30 as its main power source, wherein the bus signal conversion unit 44 performs a format conversion between the first and second bus interface formats (like an eSATA-to-SATA or USB-to-SATA data format conversion) for the data transmitted between the first bus channel 422 and the storage media 50, and/or a power voltage conversion so as to supply the proper system power based on the first power signal 322 to the storage media 50.

Figure 3A:
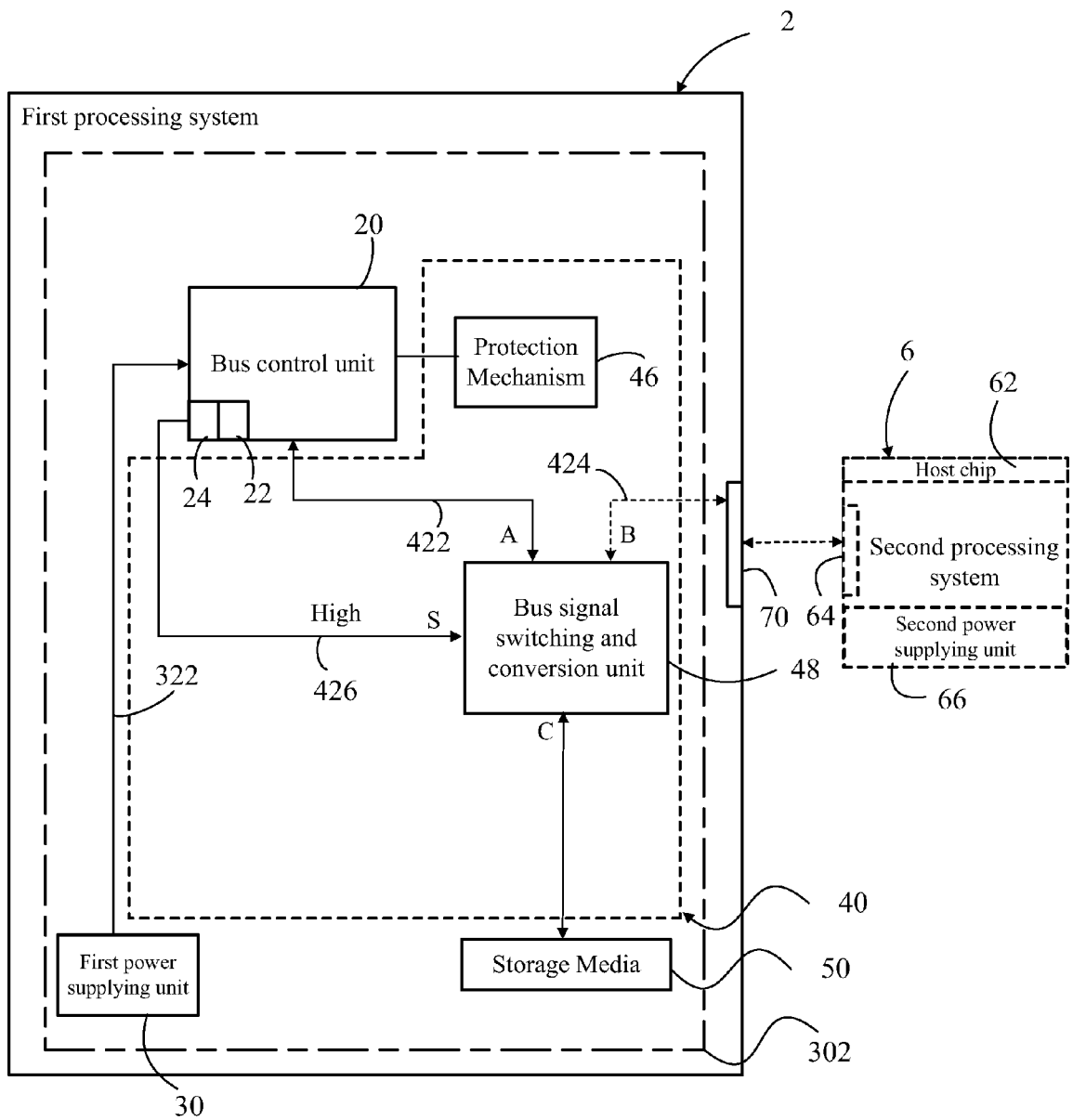
FIG. 3A illustrates an architectural block diagram of a first processing system according to a third preferred embodiment of the present invention, which expresses a status when the powered-on first processing system operates, normally and is electrically disconnected with a second processing system.

Further referring to illustration of FIG. 3A, which depicts an architectural block diagram of a first processing system 2 according to a third preferred embodiment of the present invention. Differently from the second embodiment, this third embodiment introduces that the first bus interface format can be implemented in an eSATA, a SATA or a PATA bus interface format as supported by the host chip 22 of the second processing system 2, and the second bus interface formats can be implemented in a SATA or PATA bus interface format, and the third bus interface format can be implemented in an USB interface format as supported by the host chip 62 of the second processing system 6. Thus, the first bus interface format can be designed different from or identical with the second bus interface format but different from the third bus interface format, all of which can support the hot-plug function. Except for the first bus channel 422, the second bus channel 424 and the protection mechanism 46 which are the same as used in the second embodiment, the third embodiments merely employs a bus signal switching and conversion unit 48. The bus signal switching and conversion unit 48 has three receiving terminals 'A', 'B' and 'S' and an outputting terminal C, wherein the receiving terminal 'A' is used to be electrically connected with the first bus channel 422, the receiving terminal 'B' is used to be connected with the second bus channel 424, and the receiving terminal 'S' is used to receive an external control signal 426. Based on a specific level of the received control signal 426, the bus signal switching and conversion unit 48 switches one of the receiving terminals 'A' and 'B' to be electrically connected and conducted with the outputting terminal 'C' but the other receiving terminal 'A' or 'B' not to be electrically conducted with the outputting terminal 'C'. In the third embodiment, the receiving terminal 'S' is implemented in a com.-port selecting pin or a GPIO pin for receiving the control signal 426 which is generated from the protection mechanism 46 via the GPIO pin 24 of the bus control unit 20 upon the protection mechanism 46 detecting the different level of the first power signal 322. The outputting terminal 'C' of the bus signal switching and conversion unit 48 is electrically connected to the storage media 50 with data transmission via a bus channel supporting the second bus interface format (e.g. USB). The bus signal switching and conversion unit 48 is treated as an USB-to-SATA bridge controller as using the bus signal conversion unit 44 in the second embodiment.

In operation as shown in FIG. 3A, when detecting occurrence of the first power signal 322 (as when the first processing system 2 operates in the power-on status), the protection mechanism 46 generates the control signal 426 having a first level (e.g. a specific high level) via the GPIO pin 24 of the bus control unit 20 to the receiving terminal 'S' of the bus signal switching and conversion unit 48 and thereby control or switch the bus signal switching and conversion unit 48 to be electrically connected only with the first bus channel 422 (i.e. both of the terminals 'A' and 'C' are connected only with each other). By the electrical connection with the bus signal switching and conversion unit 48, this first bus channel 422 will be capable of transmitting the first bus data having the first bus interface format (as an eSATA, a SATA or a PATA-formatted data) from/to the bus control unit 20 and supplying a system power based on the first power signal 322 from the bus control unit 20 to the bus signal switching and conversion unit 48 and the storage media 50, as constituting a first power domain 302 which regards the first power supplying unit 30 as its main power source, wherein if the first and second bus interface formats are different from each other, the bus signal switching and conversion unit 48 can further perform a format conversion between the first and second bus interface formats (like an eSATA-to-SATA data format conversion) for the accessed data transmitted between the first bus channel 422 and the storage media 50, and/or a power voltage conversion so as to supply the proper system power based on the first power signal 322 to the storage media 50. Oppositely, if the first and second bus interface formats are the same, the bus signal switching and conversion unit 48 will directly transmits the accessed data between the first bus channel 422 and the storage media 50.

Figure 3B:
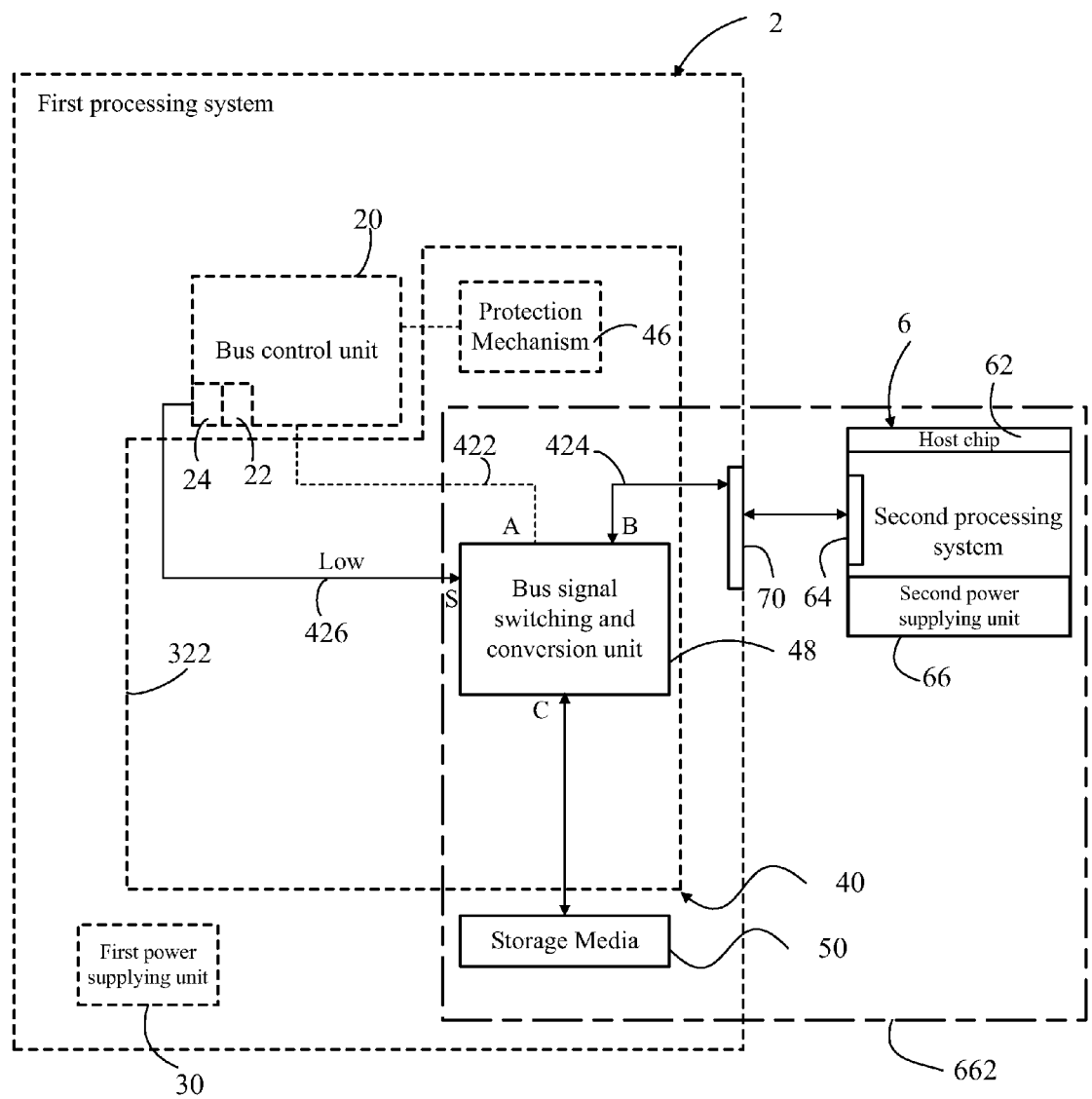
FIG. 3B illustrates the architectural block diagram of the first processing system according to the third preferred embodiment of the present invention, which expresses another status when the powered-off first processing system provides a storage media for direct data access of the second processing system.
Figure 3C:
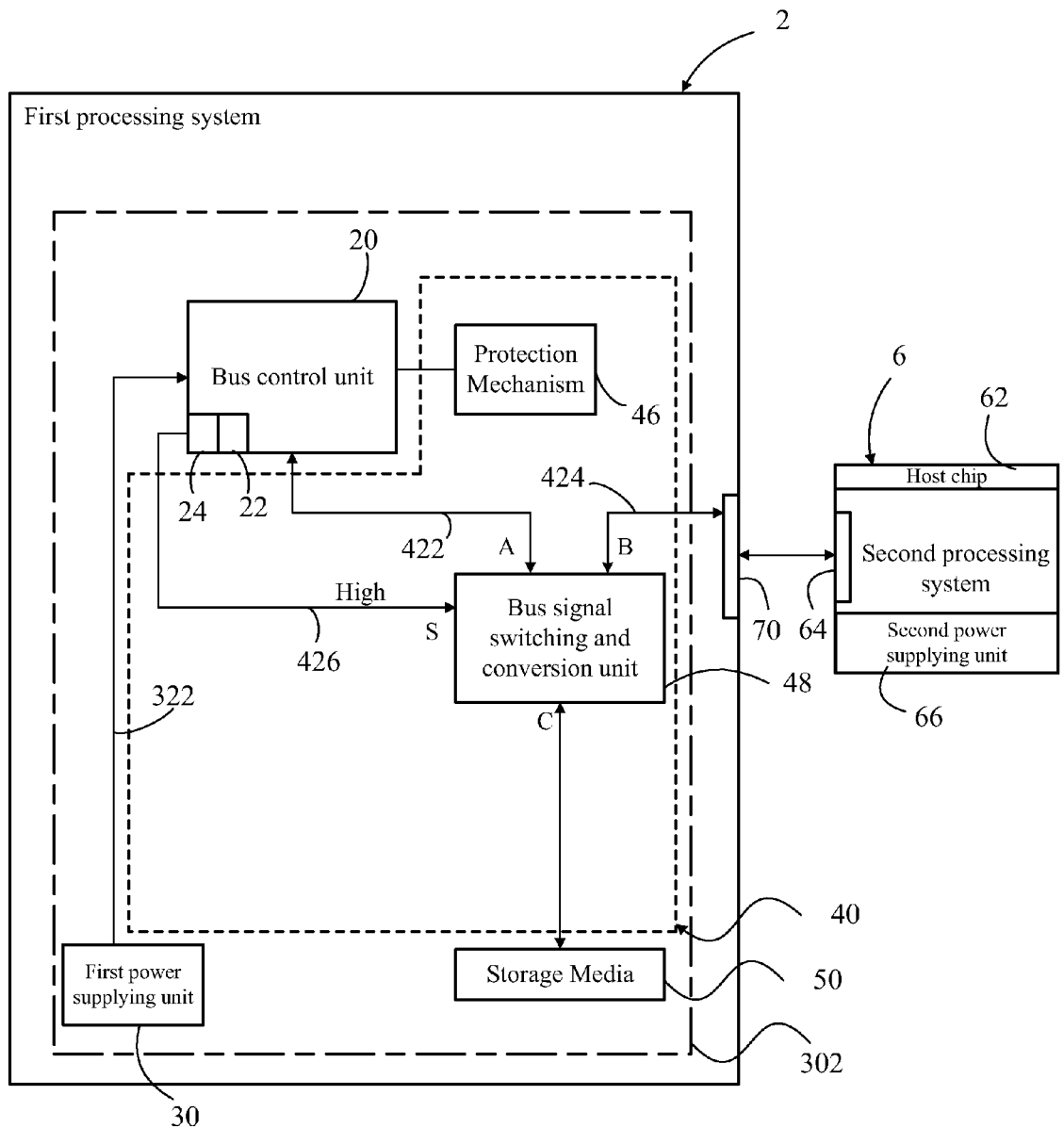
FIG. 3C illustrates the architectural block diagram of the first processing system according to the third preferred embodiment of the present invention, which expresses another status when the powered-on first processing system operates, normally and simultaneously is electrically connected with the second processing system.

On the contrary as shown in FIG. 3B, when detecting nonoccurrence of the first power signal 322 (as when the first processing system 2 is in the power-off status), the protection mechanism 46 generates the control signal 426 having a second level (e.g. a specific low level) via the GPIO pin 24 of the bus control unit 20 to the receiving terminal 'S' of the bus signal switching and conversion unit 48 and thereby control or switch the bus signal switching and conversion unit 48 to be electrically connected only with the second bus channel 424 (i.e. both of the terminals 'B' and 'C' are connected only with each other). By the electrical connection with the bus signal switching and conversion unit 48, if the second bus channel 424 is electrically connected with the second processing system 6, the second processing system 6 will be capable of transmitting/receiving the third bus data having the third bus interface format (as an USB-formatted data) from/to the bus control unit 20 via the second bus channel 424 and supplying a system power based on the second power signal from the second power supplying unit 66 via the second bus channel 424 to the bus signal switching and conversion unit 48 and the storage media 50, as constituting a second power domain 662 which regards the second power supplying unit 66 as its main power source, without a need of usage of the first power supplying unit 30, wherein the bus signal switching and conversion unit 48 can perform a format conversion between the second and third bus interface formats (like an USB-to-SATA data format conversion) for the accessed data transmitted between the second bus channel 424 and the storage media 50, and/or a power voltage conversion so as to supply the proper system power based on the second power signal to the storage media 50.

Further referring to FIG. 2C, if the first processing system 2 is rebooted to be electrically reconnected with the first power signal 322 after powered off and electrically connected the second processing system 6, the protection mechanism 46 will detect occurrence of the first power signal 322 (i.e. the first processing system 2 returns to the normal operation mode), regardless of electrical connection with the second processing system 6, and generates the control signal 426 having a first level (e.g. a specific high level) via the GPIO pin 24 of the bus control unit 20 to the receiving terminal 'S' of the bus signal switching and conversion unit 48 and thereby control or switch the bus signal switching and conversion unit 48 to be electrically connected only with the first bus channel 422 (i.e. both of the terminals 'A' and 'C' are connected only with each other). By the electrical connection with the bus signal switching and conversion unit 48, this first bus channel 422 will be capable of transmitting the first bus data having the first bus interface format (as an eSATA, a SATA or a PATA formatted data) from/to the bus control unit 20 and supplying a system power based on the first power signal 322 from the bus control unit 20 to the bus signal switching and conversion unit 48 and the storage media 50, as constituting a first power domain 302 which regards the first power supplying unit 30 as its main power source, wherein if needed, the bus signal switching and conversion unit 48 can perform a format conversion between the first and second bus interface formats (like an eSATA-to-SATA data format conversion) for the accessed data transmitted between the first bus channel 422 and the storage media 50, and/or a power voltage conversion so as to supply the proper system power based on the first power signal 322 to the storage media 50.

In another case, the first processing system may have a system controller (not shown) such as a CPU or MCU for controlling the bus control unit 20. The bus control unit 20 may be designed to include a North Bridge (NB) chip and/or a South Bridge (SB) chip, or only one SB chip having the host chip 22 but the NB chip is disposed within the system controller. In another case, the bus control unit 20 may be a system on chip (SoC) which integrates at least two of a system controller, a NB chip and a SB chip. In another case, the host chip 22 of the bus control unit 20 may be an USB host chip disposed on an USB-to-PCI external attaching card, which is electrically connected to a SB chip via a PCI slot and its PCI bus. In the various embodiments of the present invention, the GPIO pin 24 can be provided by an existent SB chip.

In conclusion, compared with the prior art, the data accessing apparatus 40 and the processing system 2 according to the present invention can permit that a storage media 50 of the processing system 2 is accessed by another processing system 6, without a need of consuming any power of the first power supplying unit 30 including a standby power, ever when the processing system 2 (i.e. a host system) is completely powered off, and thereby render the non-obviousness over the prior art. Besides, the data accessing apparatus 40 of the present invention merely employs less elements and a part of existent components (e.g. the bus control unit 20) in the processing system 2 to reach an object of sharing the storage media 50 with another processing system 6, without the needs of laying out larger components and connecting various components of the data accessing apparatus with a standby power via its related power channels, in comparison with the prior art. Thus, the present invention can make simplicity and cost savings of the whole apparatus in structure.

It is to be understood, however, that even though numerous characteristics and advantages of the present invention have been set fourth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A data accessing apparatus applied for in a processing system which has a bus control unit for transacting a first bus data having a first bus interface format, a first power supplying unit for supplying a first power signal, and at least one storage media for storing a second bus data having a second bus interface format, comprising:

a first bus channel for being electrically connected with the bus control unit to transmit the first bus data;

a second bus channel for transmitting a third bus data having a third bus interface format and supplying a second power signal generated from a power source independently of the first power supplying unit; and a bus signal switching and conversion unit which permits an electrical connection only between the first bus channel and the storage media and performs a format conversion between the first and second bus interface formats for a data transmitted between the first bus channel and the storage media and supplies a system power based on the first power signal to the storage media if the bus signal switching and conversion unit receives a control signal at a first level, and permits another electrical connection only between the second bus channel and the storage media, and performs a format conversion between the second and third bus interface formats for another data transmitted between the second bus channel and the storage media and supplies another system power based on the second power signal to the storage media if the bus signal switching and conversion unit receives the control signal at a second level.

2. The data accessing apparatus as claimed in claim 1, wherein the processing system further has a system controller for controlling the bus control unit which includes a north bridge chip and a south bridge chip.

3. The data accessing apparatus as claimed in claim 1, wherein the bus control unit is a system on chip which integrates a system controller and at least one of a north bridge chip and a south bridge chip, or the north bridge chip and the south bridge chip.

4. The data accessing apparatus as claimed in claim 1, wherein the bus control unit has a Serial Advanced Technology Attachment (SATA) bus host chip or an universal serial bus (USB) host chip.

5. The data accessing apparatus as claimed in claim 1, wherein the first power supplying unit supplies the first power signal to the bus control unit and the bus signal switching and conversion unit.

6. The data accessing apparatus as claimed in claim 1, wherein the processing system further has a peripheral bus interface supporting the third bus interface format, and the second bus channel transmits the third bus data from/to an outside of the processing system via the peripheral bus interface and receives the second power signal from the power source outside of the processing system.

7. The data accessing apparatus as claimed in claim 1, wherein the first bus interface format is identical with the third bus interface format but different from the second bus interface format, all of which support a hot-plug function.

8. The data accessing apparatus as claimed in claim 7, wherein the first bus interface format is an universal serial bus (USB) interface format or an External Serial Advanced Technology Attachment (eSATA) bus interface format, and the second bus interface format is a Serial Advanced Technology Attachment (SATA) bus interface format or a Parallel Advanced Technology Attachment (PATA) bus interface format.

9. The data accessing apparatus as claimed in claim 1, wherein the first bus interface format is different from the third bus interface format but the first, second and third bus interface formats all support a hot-plug function.

10. The data accessing apparatus as claimed in claim 9, wherein the first bus interface format is an External Serial Advanced Technology Attachment (eSATA) bus interface format, a Serial Advanced Technology Attachment (SATA)

bus interface format or a Parallel Advanced Technology Attachment (PATA) bus interface format, and the second bus interface format is the Serial Advanced Technology Attachment (SATA) bus interface format or the Parallel Advanced Technology Attachment (PATA) bus interface format, and the third bus interface format is an universal serial bus (USB) interface format.

11. The data accessing apparatus as claimed in claim 5, wherein the bus signal switching and conversion unit further includes:
   a bus switch which transmits the first bus data only from/to the first bus channel and supplies the first power signal as soon as receiving the control signal at the first level, and transmits the third bus data only from/to the second bus channel and supplies the second power signal as soon as receiving the control signal at the second level; and
   a bus signal conversion unit electrically connected the bus switch and the storage media, performing a format conversion between either the first and second bus interface formats or the second and third bus interface formats for a data transmitted between the bus switch and the storage media, and supplying the system power based on one of the first and second power signals to the storage media.

12. The data accessing apparatus as claimed in claim 11, wherein the control signal is implemented with the second power signal transmitted from the second bus channel, wherein the first level of the control signal is set to zero when the bus switch does not receive the second power signal yet, and the second level of the control signal is set to a specific high level when the bus switch receives the second power signal.

13. The data accessing apparatus as claimed in claim 11, further comprising a protection mechanism which is used to generate the control signal at the first level to control an electrical connection only between the bus switch and the first bus channel upon detecting occurrence of the first power signal, and generate the control signal at the second level to control another electrical connection only between the bus switch and the second bus channel upon detecting nonoccurrence of the first power signal.

14. The data accessing apparatus as claimed in claim 1, further comprising a protection mechanism which is used to generate the control signal at the first level to control the electrical connection only between the storage media and the first bus channel upon detecting occurrence of the first power signal, and generate the control signal at the second level to control the electrical connection only between the storage media and the second bus channel upon detecting nonoccurrence of the first power signal.

15. The data accessing apparatus as claimed in claim 13 or 14, wherein the bus control unit has a General Purpose I/O (GPIO) architecture, and the protection mechanism generates the control signal via the GPIO architecture.

16. A processing system suited for electrically connecting to another processing system, comprising:
   a first power supplying unit for supplying a first power signal;
   a bus control unit for transacting a first bus data having a first bus interface format;
   a first bus channel for electrically connecting to the bus control unit to transmit the first bus data;
   a second bus channel for transmitting a third bus data having a third bus interface format, from/to the another processing system and supplying a second power signal generated from a power source independently of the first power supplying unit;
   at least one storage media for storing a second bus data having a second bus interface format; and
   a bus signal switching and conversion unit which permits an electrical connection only between the first bus channel and the storage media and performs a format conversion between the first and second bus interface formats for a data transmitted between the first bus channel and the storage media and supplies a system power based on the first power signal to the storage media if the bus signal switching and conversion unit receives a control signal at a first level, and permits another electrical connection only between the second bus channel and the storage media, and performs a format conversion between the second and third bus interface formats for another data transmitted between the second bus channel and the storage media and supplies another system power based on the second power signal to the storage media if the bus signal switching and conversion unit receives the control signal at a second level.

17. The processing system as claimed in claim 16, further comprising a system controller for controlling the bus control unit which includes a north bridge chip and a south bridge chip.

18. The processing system as claimed in claim 16, wherein the bus control unit is a system on chip which integrates at least two of a system controller, a north bridge chip and a south bridge chip.

19. The processing system as claimed in claim 16, wherein the bus control unit has a Serial Advanced Technology Attachment (SATA) bus host chip or an universal serial bus (USB) host chip.

20. The processing system as claimed in claim 16, wherein the first power supplying unit supplies the first power signal to the bus control unit and the bus signal switching and conversion unit.

21. The processing system as claimed in claim 16, further comprising a peripheral bus interface supporting the third bus interface format, whereby the second bus channel transmits the third bus data from/to the another processing system via the peripheral bus interface and receives the second power signal from the power source disposed in the another processing system.

22. The processing system as claimed in claim 16, wherein the power source is a second power supplying unit for supplying the second power signal to the bus signal switching and conversion unit.

23. The processing system as claimed in claim 16, wherein the first bus interface format is identical with the third bus interface format but different from the second bus interface format, all of which support a hot-plug function.

24. The processing system as claimed in claim 23, wherein the first bus interface format is an universal serial bus (USB) interface format or an External Serial Advanced Technology Attachment (eSATA) bus interface format, and the second bus interface format is a Serial Advanced Technology Attachment (SATA) bus interface format or a Parallel Advanced Technology Attachment (PATA) bus interface format.

25. The processing system as claimed in claim 16, wherein the first bus interface format is different from the third bus interface format but the first, second and third bus interface formats all support a hot-plug function.

26. The processing system as claimed in claim 25, wherein the first bus interface format is an External Serial Advanced Technology Attachment (eSATA) bus interface format, a Serial Advanced Technology Attachment (SATA) bus interface format or a Parallel Advanced Technology Attachment (PATA) bus interface format, and the second bus interface format is the Serial Advanced Technology Attachment (SATA) bus interface format or the Parallel Advanced Technology Attachment (PATA) bus interface format, and the third bus interface format is an universal serial bus (USB) interface format.

27. The processing system as claimed in claim 20, wherein the bus signal switching and conversion unit further includes:
   a bus switch which transmits the first bus data only from/to the first bus channel and supplies the first power signal as soon as receiving the control signal at the first level, and transmits the third bus data only from/to the second bus channel and supplies the second power signal as soon as receiving the control signal at the second level; and
   a bus signal conversion unit electrically connected the bus switch and the storage media, performing a format conversion between either the first and second bus interface formats or the second and third bus interface formats for a data transmitted between the bus switch and the storage media, and supplying the system power based on one of the first and second power signals to the storage media.

28. The processing system as claimed in claim 27, wherein the control signal is implemented with the second power signal transmitted from the second bus channel, wherein the first level of the control signal is set to zero when the bus switch does not receive the second power signal yet, and the second level of the control signal is set to a specific high level when the bus switch receives the second power signal.

29. The processing system as claimed in claim 27, further comprising a protection mechanism which is used to generate the control signal at the first level to control an electrical connection only between the bus switch and the first bus channel upon detecting occurrence of the first power signal, and generate the control signal at the second level to control another electrical connection only between the bus switch and the second bus channel upon detecting nonoccurrence of the first power signal.

30. The processing system as claimed in claim 16, further comprising a protection mechanism which is used to generate the control signal at the first level to control the electrical connection only between the storage media and the first bus channel upon detecting occurrence of the first power signal, and generate the control signal at the second level to control the electrical connection only between the storage media and the second bus channel upon detecting nonoccurrence of the first power signal.

31. The processing system as claimed in claim 29 or 30, wherein the bus control unit has a General Purpose I/O (GPIO) architecture, and the protection mechanism generates the control signal via the GPIO architecture.

* * * * *